(12) United States Patent
Hamborg

(10) Patent No.: US 7,027,221 B2
(45) Date of Patent: Apr. 11, 2006

(54) AUTOFOCUS METHOD FOR A MICROSCOPE AND SYSTEM FOR ADJUSTING THE FOCUS FOR A MICROSCOPE

(75) Inventor: Martin Hamborg, Solms (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 66 days.

(21) Appl. No.: 10/417,977

(22) Filed: Apr. 17, 2003

(65) Prior Publication Data

US 2003/0197925 A1    Oct. 23, 2003

(30) Foreign Application Priority Data

Apr. 18, 2002   (DE) ............................. 102 17 404

(51) Int. Cl.
*G02B 21/00*    (2006.01)

(52) U.S. Cl. .................................. 359/383; 250/201.3

(58) Field of Classification Search ................ 359/368, 359/391, 392, 383; 250/201.3, 201.7; 396/101, 396/125, 127; 348/353–356

See application file for complete search history.

(56) References Cited

U.S. PATENT DOCUMENTS

| 3,721,759 | A |   | 3/1973 | Lang |
|---|---|---|---|---|
| 4,958,920 | A |   | 9/1990 | Jorgens et al. |
| 5,932,872 | A | * | 8/1999 | Price ...................... 250/201.3 |
| 6,825,454 | B1 | * | 11/2004 | Czarnetzki et al. ...... 250/201.3 |

FOREIGN PATENT DOCUMENTS

| DE | 38 28 381 | 9/1997 |
|---|---|---|
| DE | 20111006 | 9/2001 |
| EP | 0 124 241 | 11/1988 |
| EP | 1115021 | 7/2001 |
| WO | 00/75709 | 12/2000 |

OTHER PUBLICATIONS

Miguel Bravo-Zanoguera, High Performance Autofocus Circuit For Biological Microscopy, American Institute of Physics p. 3966-3977 (1998).

* cited by examiner

*Primary Examiner*—Mark A. Robinson
*Assistant Examiner*—Alessandro Amari
(74) *Attorney, Agent, or Firm*—Simpson & Simpson, PLLC

(57) ABSTRACT

An auto focus method for a microscope (2), and a system for adjusting a focus for the microscope (2), are disclosed. The microscope (2) possesses a microscope stage (18) and an objective (16) located in a working position. A relative motion in the Z direction takes place between the microscope stage (18) and the objective. Images are read in by the camera (20) during the relative motion, and a microscope control device (4) and a computer (6) are provided for evaluation and determination of the focus position.

7 Claims, 6 Drawing Sheets

AUTOFOCUS METHOD FOR A MICROSCOPE AND SYSTEM FOR ADJUSTING THE FOCUS FOR A MICROSCOPE

CROSS REFERENCE TO RELATED APPLICATIONS

This application claims priority of the German patent application 102 17 404.0-42 which is incorporated by reference herein.

FIELD OF THE INVENTION

The invention concerns an auto focus method for a microscope.

The invention also concerns a system for adjusting the focus for a microscope. In particular, the system concerns a microscope having: an objective arranged in a working position and a microscope stage, such that a relative motion can be generated in the Z direction between the objective and the microscope stage; a camera that is connected to the microscope in order to acquire images of a specimen; a microscope control device; and a computer that is connected via at least one connection to the microscope control device.

BACKGROUND OF THE INVENTION

European Patent Application EP-A-0 124 241 discloses a microscope having an automatic focus device. The microscope encompasses a storage device for saving data from the objectives that are being used in the microscope. Also provided is a control device that monitors and controls the various microscope functions. Another of the tasks of the control device is motion of the microscope stage (also called the focusing stage). Provided as the image acquisition device is a CCD element which receives an image from the particular selected objective and, together with a calculation unit, determines the optimum focus position based on contrast. The objective data of the objective currently in use must be taken into account in determining the optimum degree of sharpness. The system disclosed here is not configured to determine contrast values in the context of a microscope stage moved continuously in the Z direction.

A problem in automatic focus adjustment for microscopes is that the time for achieving the optimum focus position is too long.

SUMMARY OF THE INVENTION

It is accordingly the object of the present invention to create an auto focus method for a microscope that focuses automatically, quickly, and reliably on a microscopic specimen.

The object is achieved by way of a method which comprises the following steps:
 a) acquiring an image with a camera during continuous execution of the relative motion in the Z direction between the microscope stage and the objective;
 b) determining the Z position, reached by way of the relative motion, at which the image was read out from the camera;
 c) calculating a contrast value for the read-out image;
 d) storing the Z position reached by way of the relative motion, and the associated contrast value;
 e) performing steps a) through d) until a defined final position has been reached by way of the relative motion in the Z direction;
 f) ascertaining a continuous contrast value function from the various Z positions, and the contrast value belonging to the respective Z position;
 g) calculating, from the continuous contrast value function, a maximum contrast value and the associated Z position; and
 h) arriving at the Z position that is associated with the maximum contrast value.

A further object of the invention is accordingly to create a system for adjusting the focus of a microscope that focuses automatically, quickly, and reliably on a microscopic specimen.

The object is achieved by way of a system for adjusting the focus for a microscope comprising: an objective arranged in a working position, a microscope stage, means for generating a relative motion in the Z direction between the objective and the microscope stage; a camera that is connected to the microscope in order to acquire images of a specimen; a microscope control device; a computer that is connected via at least one connection to the microscope control device, means for generating a trigger signal in the computer, wherein the trigger signal indicates a completion of each image infeed by the camera and an instantaneous Z position of the continuous relative motion.

It is particularly advantageous that for determination of the focus, the relative motion between the microscope stage and an objective located in the working position can proceed without interruption. Aside from other advantages, this results in appreciably fast determination of the optimum focus position. The use of a video camera is advantageous because economical and rapid image acquisition is possible with such a camera. It is also conceivable to use a digital camera for acquisition of the images of the specimen.

The system for adjusting the focus for a microscope, having an objective arranged in the working position and a microscope stage, is embodied in such a way that a relative motion in the Z direction can be generated between the objective and the microscope stage. Also provided is a camera that can be embodied in the form of a video camera. The camera is connected to the microscope via the photo tube, so as thereby to acquire the images of the specimen. Also provided are a microscope control device and a computer, which are connected to one another via at least one connection. The computer encompasses a means for generating a trigger signal, in which context the trigger signal triggers, after completion of each image infeed by the camera, the determination of the instantaneous Z position of the continuous relative motion. The Z position determined in this fashion is stored in a memory in the microscope control device. For determination of the optimum focus position, the Z position values are retrieved from the memory.

BRIEF DESCRIPTION OF THE DRAWINGS

Further advantages and advantageous embodiments are the subject matter of the description below of the Figures, in which, in detail.

DETAILED DESCRIPTION OF THE INVENTION

Figure 1:
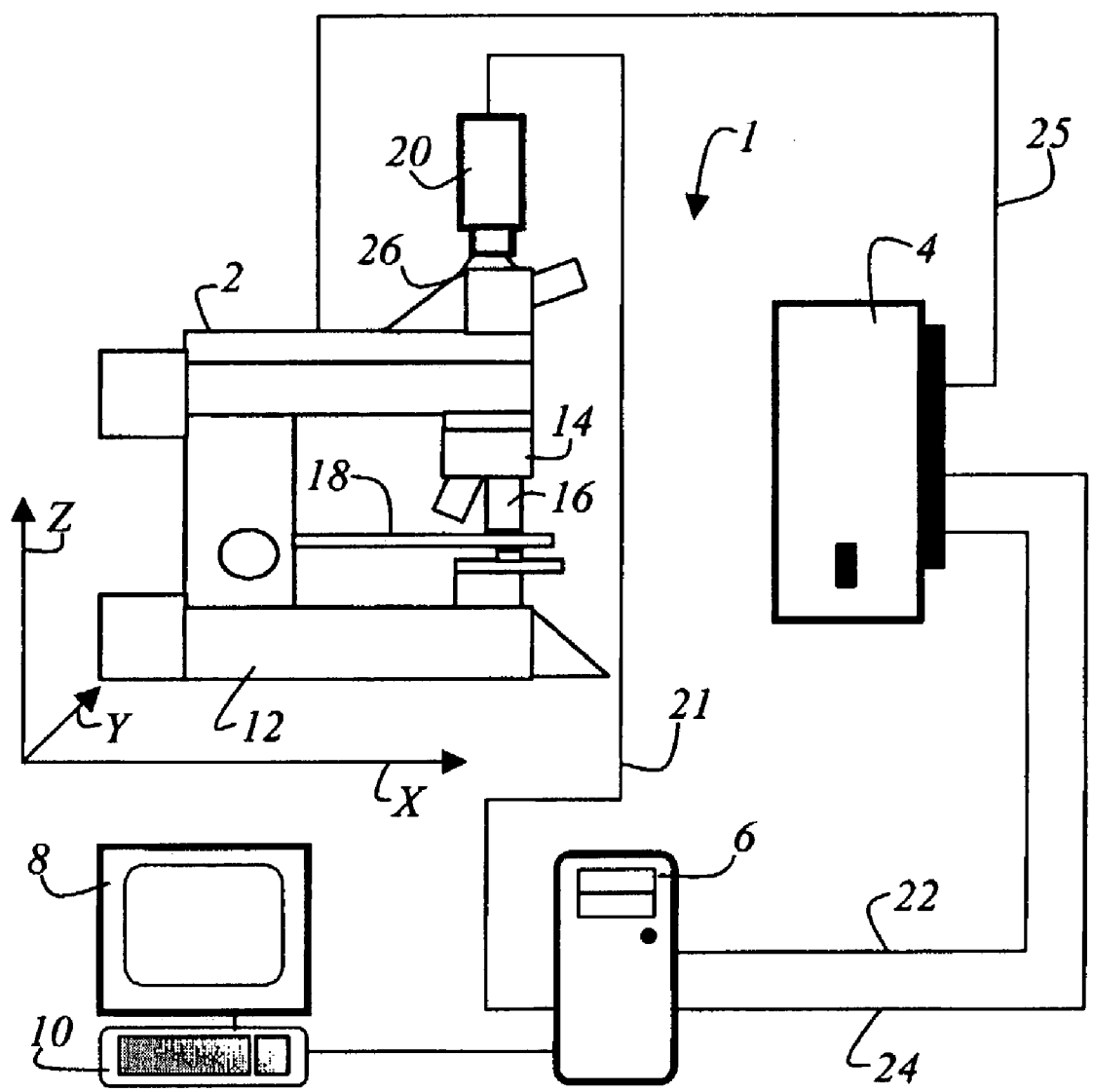
FIG. 1 schematically depicts the system for adjusting the focus for a microscope.

FIG. 1 schematically depicts a system 1 for adjusting the focus for a microscope 2. System 1 encompasses microscope 2, a microscope control device 4, a computer 6 in which a frame grabber (not depicted) is installed, and a display 8 having a keyboard 10. Microscope 2 comprises and automatic microscope (e.g. Leica DM LA having microscope control device 4. Microscope 2 and microscope control device 4 communicate via a special control cable 25. The configuration of microscope 2 will not be discussed in further detail. Only those components of microscope 2 that are of essential significance for the invention will be described further. Microscope 2 comprises a stand 12 on which a objective turret 14 is mounted. Objective turret 14 carries at least one objective 16. In its working position, objective 16 is provided opposite a microscope stage 18. Microscope stage 18 is movable in X direction X, Y direction Y, and Z direction Z. The focus position can be modified or arrived at by generating a relative motion between microscope stage 18 and objective 16 in the working position. For determination of the focus position, a video camera 20 is mounted on microscope 2 in such a way that the image of the specimen imaged through objective 16 is acquired with video camera 20. Video camera 20 is connected via a video cable 21 to computer 6. The signals acquired from video camera 20 are digitized by means of the frame grabber in computer 6. Computer 6 is connected via a first serial cable 22 to microscope control device 4. Computer 6 is additionally connected via a second serial cable 24 to microscope control device 4. Microscope control device 4 serves to control the automatic functions of microscope 2, for example Z drive motion (movement in Z direction Z), movement of the microscope stage in X and Y directions X and Y, selection of a suitable objective, and much more. Computer 6 and microscope control device 4 communicate via first serial cable 22. Video camera 20 is mounted on a photo tube 26 of microscope 2. Second serial cable 24 transfers trigger signals from computer 6 to microscope control device 4. These solutions trigger position determinations in the Z drive. The Z drive can bring about either a displacement of microscope stage 18 in the Z direction, or a displacement of objective 16 in the Z direction.

Figure 2:
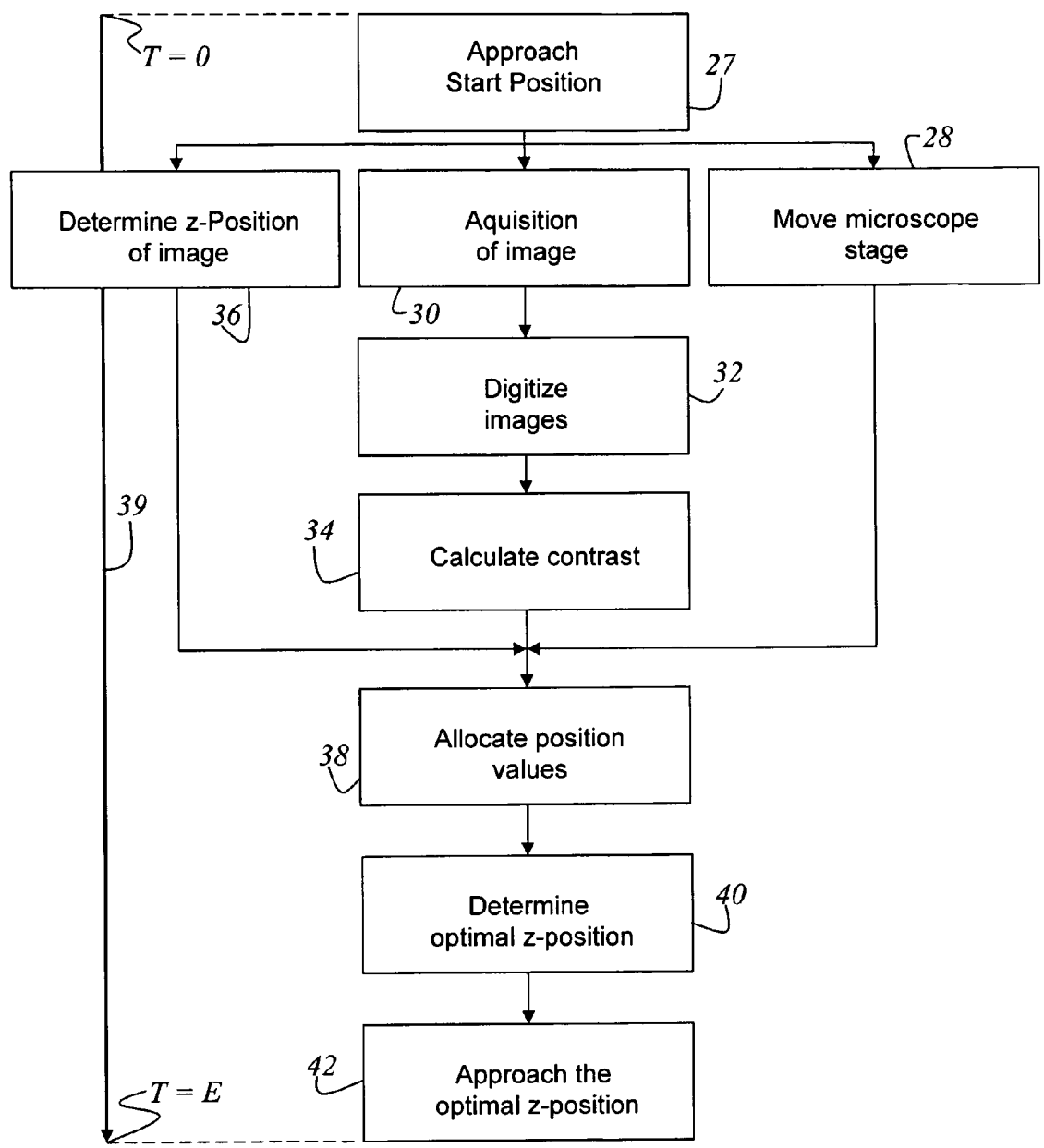
FIG. 2 schematically depicts the method for determining the Z position having the optimum focus position.

For the description below, a displacement of the Z position is to be understood as a displacement of microscope stage 18 in Z direction Z. When the focus function is started with microscope control device 4, an arrival at starting position 27 occurs at the beginning of the focus function. The arrival at starting position 27 is performed from instantaneous position $z_0$ to starting position $z_1 = z_0 - r/2$, where r is the search region (referred to as the focus capture region) in Z direction Z. As a rule, the focus capture region is a range on either side of the ideal focus position. Next a movement 28 of the Z drive (or microscope stage 18) of microscope 2 occurs at constant velocity. Movement 28 through the focus capture region is performed until a final position $Z_2 = Z_o + r/2$ is reached. Acquisition of images 30, which is performed concurrently with motion of the Z drive, is accomplished by means of video camera 20. In this context, images are acquired continuously at the maximum possible frequency (e.g. 25 images per second). Digitization 32 of these images is performed by the frame grabber present in computer 6. A time scale 39 (arbitrary units) is also plotted in FIG. 2. It is evident from this that a determination 36 of the instantaneous Z position, movement 28 of Z drive of microscope 2, and acquisition of images 30 occur concurrently. It is also to be noted that during the entire time (from T=0 to T=E) until the suitable focus position has been set, microscope stage 18 is only minimally halted. Between the motion through the capture region (region within which the optimum focus position is located) and the subsequent motion to the focus position, computational determination of that focus position is performed (interpolation). An interruption of minimal duration occurs between the two motions.

Computer 6 determines, on the basis of the image data, the contrast value of each individual image. In the determination of the contrast, it is not necessary to employ the entire individual image. As a rule, it is sufficient to limit the contrast determination to a central subregion of the individual image. A contrast calculation 34 is implemented in such a way that it is performed for an image concurrently with infeed of the image subsequent thereto. The maximum movement velocity of the Z drive is selected so that significant contrast values can still be obtained from the individual images. Trigger signals synchronized in time with the image acquisitions are sent from computer 6 via second serial cable 24 to microscope control device 4. Each trigger signal triggers, in microscope control device 4, a determination 36 of the instantaneous Z position. All the Z positions belonging to one measurement are stored temporarily in microscope control device 4.

After the focus measurement, a relevant subset of the position values is transferred from microscope control device 4 to computer 6. An allocation 38 of the position values to the respective contrast values is performed. The contrast values are plotted on the ordinate as a function of the Z positions. From them, a determination 40 of the suitable focus position (or Z position) is made by means of a suitable mathematical process. Lastly, that Z position is arrived at in order to focus the microscope image. That arrival 42 is accomplished by actuation of the Z drive.

If a significantly sharp image is not present within the focus capture region, the process described above is repeated, several times as applicable, with a positionally shifted or enlarged capture region.

Figure 3:
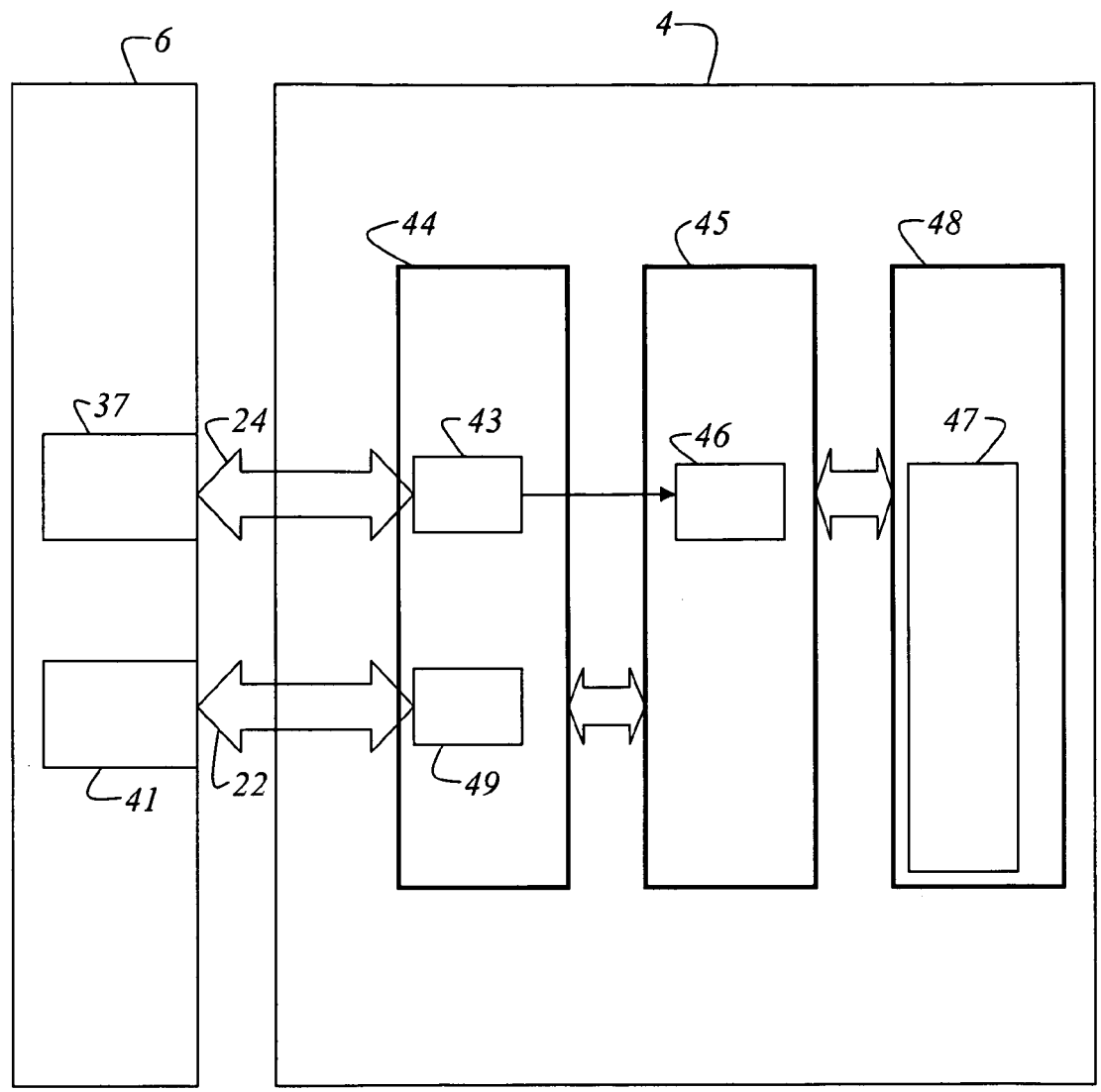
FIG. 3 depicts the coaction of the computer with the microscope control device for determination of the optimum focus position.

FIG. 3 illustrates the coaction of computer 6 with microscope control device 4. During the focus measurement, after the completion of each image infeed a trigger signal is generated by computer 6 and initiates, on the part of microscope control device 4, an immediate determination of the instantaneous position of the Z drive (or of the position of microscope stage 18). Second serial cable 24 is connected to a second serial interface 37 of computer 6. The trigger signal manifests itself as a signal edge change on a handshake line of second serial cable 24 between computer 6 and microscope control device 4, and is recorded by microscope control device 4 on a modem status input 43 (e.g. CTS clear-to-send) of a UART (universal asynchronous receiver/transmitter) serial interface IC 44. UART 44 reacts to the signal by initiating an external interrupt 46 in a microcontroller 45 in microscope control device 4 that is responsible for controlling the Z drive. The interrupt service routine that is then called ascertains the instantaneous position of the Z drive and writes the value into a data field 47 that is implemented in a memory unit 48 provided in microscope control device 4. The instantaneous position is stored in a Z position table in memory unit 48. The table index is incremented by one after each write operation. This operation repeats for every image infeed of a focus measurement. After completion of the measurement, some of the position data are retrieved by computer 6 via first serial cable 22 and employed to determine the focus position. First serial cable 22 is connected to first serial interface 41 of computer 6. UART interface IC 44 possesses a further serial interface 49 through which first serial cable 22 connects computer 6 to microscope control device 4.

Figure 4:
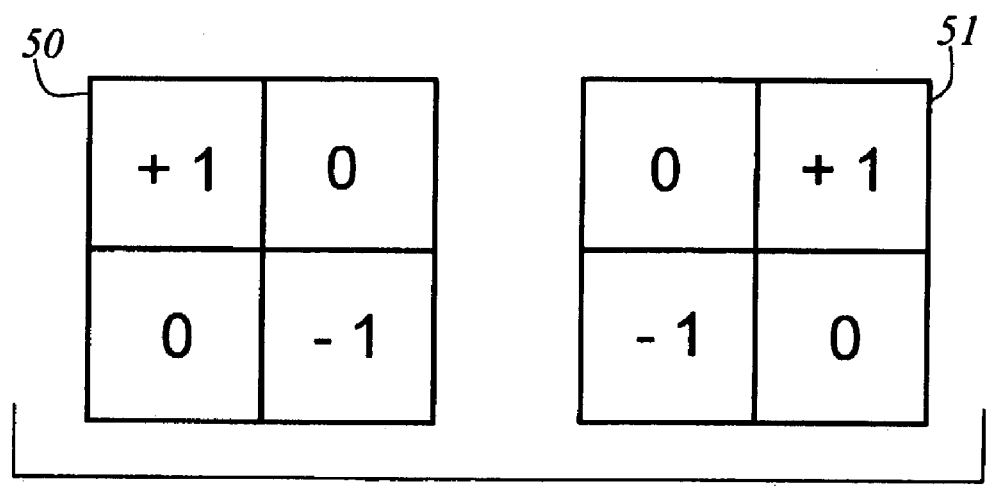
FIG. 4 graphically depicts a Roberts-Cross operator.

Determination of the contrast value of a particular infed image proceeds according to suitable mathematical methods. In a first step, a transformation of the grayscale image is performed, advantageously using the Roberts-Cross operator (see FIG. 4).

Roberts-Cross image transformation generates from a grayscale image, with little computational outlay, a so-called gradient image. In it, image regions with originally high contrast appear bright, and those based on homogeneous image regions appear dark. The grayscale values of the image points are the contributions of the gradients to the image point locations of the original image.

The Roberts-Cross operator comprises a first 2×2 filter core 50 and a second 2×2 core 51. Second 2×2 filter core 51 is rotated 90° with respect to first 2×2filter core 50. The 90° rotation is clearly evident from a comparison of first 2×2 filter core 50 and second 2×2 filter core 51. The values in the fields of first filter core 50 are each shifted one field clockwise in second 2×2 filter core 51. First 2×2 filter core 50 is designated $G_x$, and second 2×2 filter core 51 is designated $G_y$.

The gradient value of an image point is then defined by equation 1:

$$|G| = \sqrt{G_x^2 + G_y^2}. \qquad \text{equation 1}$$

It is easier to calculate an approximate gradient value, which is determined from equation 2:

$$|G| = |G_x| + |G_y| \qquad \text{equation 2.}$$

Figure 5:
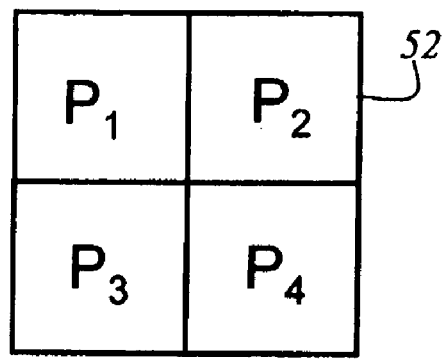
FIG. 5 graphically depicts a pseudo-operator for determining the gradient value.

This value can be determined in one step using a pseudo-operator 52 (see FIG. 5).

Using pseudo-operator 52, the gradient can be calculated as defined by equation 3:

$$|G| = |P_1 - P_4| + |P_2 - P_3| \qquad \text{equation 3.}$$

The advantage of this pseudo-operator 52 is that it requires little computation time. The image transformation can thus be performed by a computer of ordinary performance capability in a fraction of the video cycle time (time for acquisition of one image).

Figure 6:
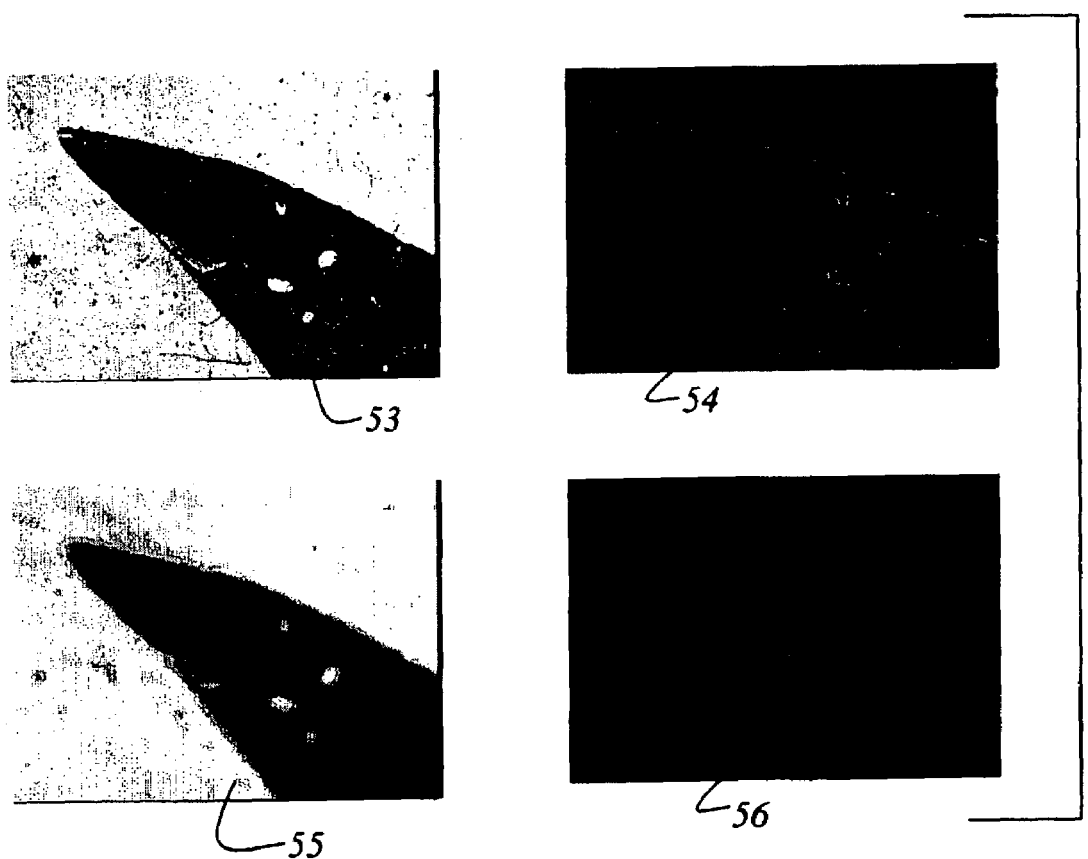
FIG. 6 shows the results of the image transformation performed with the pseudo-operator of FIG. 5, based on a real image.

FIG. 6 shows the results of the image transformation performed with pseudo-operator 52. The transformation of a sharp image 53 causes the contours of the specimen in sharp image 53 to be clearly delineated in gradient image 54. In the transformation of an unsharp image 55, no contours are evident in gradient image 56 of unsharp image 55. The contrast value of unsharp image 55 is therefore much lower than the contrast value of sharp image 53.

From each gradient image, a parameter K is obtained that quantifies the contrast of the image, i.e. represents the contrast value of each image. For determination of the contrast value K, the grayscale frequency distribution of each gradient image is determined and is saved in a data field H[1, 2, . . . N]. The image contrast K is determined, for example, in each grayscale image at 8-bit grayscale resolution using:

$$K = \frac{1}{N}\sum_{i=i_0}^{255} H[i] * i. \qquad \text{equation 4}$$

The product H[i]*i results in greater weighting of the higher grayscale values of the gradient image, whose occurrence increases with increasing image sharpness. $H(i<i_0)$ (e.g. $i_0=2$) encompasses all image points with no gradient or with a low gradient caused by noise, so that these points are not included in the contrast determination. The level of $i_0$ can be adapted to the characteristics of the specimen that is to be focused on. K is normalized by division by N, representing the total number of image points considered or utilized for focus determination.

Figure 7:
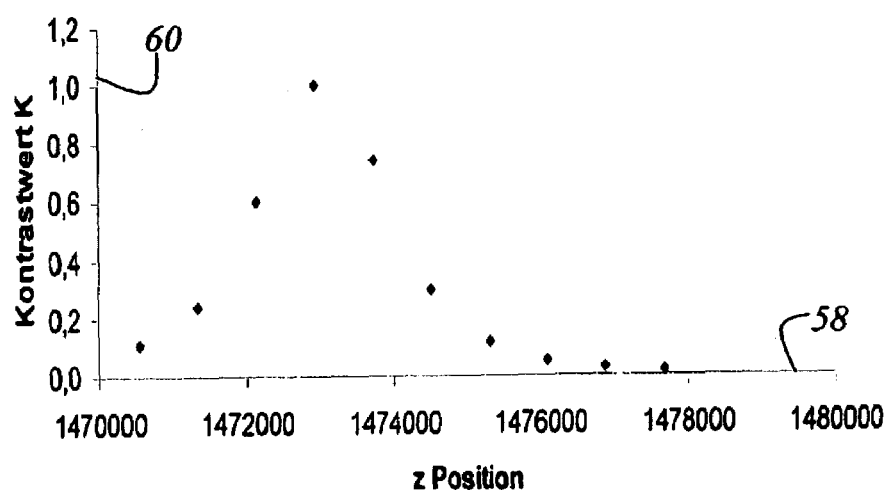
FIG. 7 graphically depicts the contrast values as a function of Z position.

FIG. 7 shows the (normalized) focus function K=f(z) that was obtained by focus measurement of the microscopic scene of FIG. 6 (objective magnification=10×). To decrease computation time, only a region encompassing 200×200 image points at the center of the entire image (768×576 image points) was employed for contrast determination. All the contrast values K are normalized with the maximum value of the focus function. The Z position is plotted on abscissa 58 in system-specific units (1000 units correspond to 15 μm). The normalized contrast value K is plotted on ordinate 60. Each of the points in FIG. 7 stands for a contrast value K of an acquired image. From the plurality of points, it is possible to recognize a definitely constituted maximum.

If it is assumed that the profile of the real focus function is continuous, it can be described, based on the identified discrete value pairs in FIG. 7, by means of a polynomial interpolation. The interpolating N-1 order polynomial that proceeds through the N points $y_1=f(x_1)$, $y_2=f(x_2)$, . . . $y_N=f(x_N)$, is generated using the Lagrange formula (see equation 5).

$$P = \frac{(x-x_2)(x-x_3)\ldots(x-x_N)}{(x_1-x_2)(x_1-x_3)\ldots(x_1-x_N)}y_1 + \qquad \text{equation 5}$$
$$\frac{(x-x_1)(x-x_3)\ldots(x-x_N)}{(x_2-x_1)(x_2-x_3)\ldots(x_2-x_N)}y_2 + \ldots +$$
$$\frac{(x-x_1)(x-x_2)\ldots(x-x_{N-1})}{(x_N-x_1)(x_N-x_2)\ldots(x_N-x_{N-1})}y_N$$

If the value pairs of the measured focus function (see FIG. 7) are inserted into equation 5 as "points," the polynomial of a continuous focus function is obtained. The value $x_{max}$ at which $P(X_{max})$ is maximal within the focus capture region may be regarded as the "ideal" focus position. Practical experience shows that a sharper image is usually obtained at this position than at the position at which the measured discrete focus function exhibits the maximum contrast value.

Computational determination of the interpolated focus position is performed using the computation routine described in William H. Press (ed.) et al., Numerical Recipes in C: the Art of Scientific Computing, copyright©1988–1992 by Cambridge University Press. Chapter 3.1, p.108. The routine supplies, on the basis of coordinates of discrete function points and an arbitrary X value, the relevant Y value of the interpolated function. The X value here represents the Z position of microscope stage 18, and the Y value ascertained for the X value is the contrast value.

Figure 8:
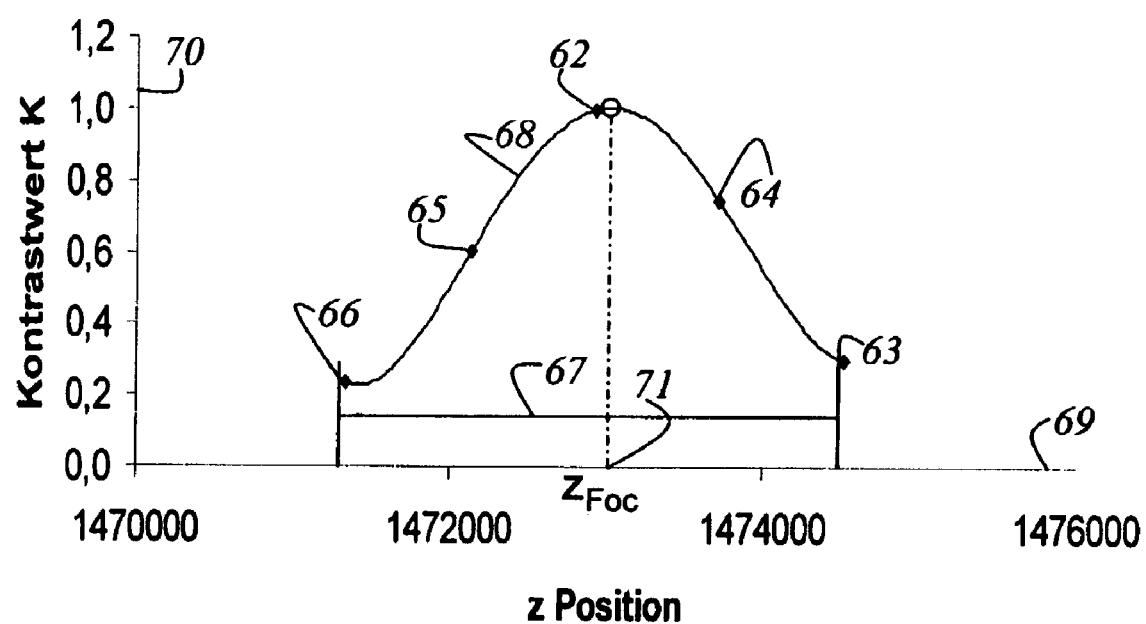
FIG. 8 graphically depicts the identification of the Z position having the optimum focus, based on an interpolation method.

As depicted in FIG. 8, the number of points considered when searching for the interpolated focus position is limited to five, namely a point 62 of the discrete function maximum and its adjacent points 63, 64 and 65, 66 to the left and right. The two outer adjacent points 63 and 66 constitute the limits of a range 67 within which the function maximum is ascertained by multiple calls of the computation routine with increasing X values (in this case, Z position of the microscope stage). The increase in the defined X values is selected here to be much less than the distance between two adjacent measurement points. Focus position $Z_{Foc}$ 71 found in this fashion in the aforementioned range of a continuous function 68 represents the optimum focus position. The position of the Z drive is plotted on abscissa 69, and the contrast value on ordinate 70. Based on the maximum of the contrast value thus found, the Z position corresponding to the maximum contrast value can be determined from the continuous curve. The Z drive of the microscope is actuated in corresponding fashion so as to move into the Z position having the maximum contrast value.

The invention has been described with reference to a particular exemplary embodiment. It is self-evident, however, that changes and modifications can be made without thereby leaving the range of protection of the claims below.

What is claimed is:

1. An auto focus method for a microscope, the microscope being configured such that a continuous relative motion in the Z direction can be achieved between a microscope stage and an objective located in a working position, characterized by the following steps:
   a) acquiring an image with a camera during continuous relative motion in the Z direction between the microscope stage and the objective;
   b) determining the Z position, reached by way of the continuous relative motion, at which the image was read out from the camera;
   c) calculating a contrast value for the read-out image;
   d) storing the Z position reached by way of the relative motion, and the associated contrast value;
   e) performing steps a) through d) until a defined final position has been reached by way of the continuous relative motion in the Z direction;
   f) ascertaining a continuous contrast value function from the various Z positions, and the contrast value belonging to the respective Z position;
   g) calculating, from the continuous contrast value function, a maximum contrast value and the associated Z position; and
   h) arriving at the Z position that is associated with the maximum contrast value.

2. The auto focus method as defined in claim 1, wherein the continuous relative motion between the microscope stage and the objective located in the working position is generated by a continuous movement in the Z direction of the microscope stage.

3. The auto focus method as defined in claim 1, wherein the continuous relative motion between the microscope stage and the objective located in the working position is generated by a continuous movement in the Z direction of the objective located in the working position.

4. The auto focus method as defined in claim 3, wherein prior to the continuous movement of the objective, a starting position $z_1$ is arrived at, the starting position $z_1$ being calculated from an instantaneous position $z_0$ of the objective in accordance with the equation $z_1 = z_0 - r/2$, r designating a search region on either side of the instantaneous position $z_0$.

5. The auto focus method as defined in claim 2, wherein prior to the continuous movement of the microscope stage in the Z direction and the acquisition of multiple images with the camera, a starting position is arrived at with the microscope stage.

6. The auto focus method as defined in claim 5, wherein during the continuous relative motion between the microscope stage and the objective, and after completion of each image infeed, a trigger signal is generated by a computer and initiates, at a microscope control device, an immediate determination of the instantaneous position of the Z drive generating the continuous relative motion.

7. The auto focus method as defined in claim 2, wherein prior to the continuous movement of the microscope stage, a starting position $z_1$ is arrived at, the starting position $z_1$ being calculated from an instantaneous position $z_0$ of the microscope stage in accordance with the equation $z_1 = z_o - r/2$, r designating a search region on either side of the instantaneous position $z_o$.

* * * * *

UNITED STATES PATENT AND TRADEMARK OFFICE
CERTIFICATE OF CORRECTION

| | | |
|---|---|---|
| PATENT NO. | : 7,027,221 B2 | |
| APPLICATION NO. | : 10/417977 | |
| DATED | : April 11, 2006 | |
| INVENTOR(S) | : Martin Hamborg | |

It is certified that error appears in the above-identified patent and that said Letters Patent is hereby corrected as shown below:

Column 7, line 46, in Claim 1, insert --continuous-- before "relative".

Signed and Sealed this

First Day of August, 2006

JON W. DUDAS
*Director of the United States Patent and Trademark Office*